(12) United States Patent
Bagnoli

(10) Patent No.: US 7,073,806 B2
(45) Date of Patent: Jul. 11, 2006

(54) THREE-WHEEL ROLLING VEHICLE WITH FRONT TWO-WHEEL STEERING

(75) Inventor: Alessandro Bagnoli, Perignano di Lari (IT)

(73) Assignee: Piaggio & C. S.p.A., Pisa (IT)

( * ) Notice: Subject to any disclaimer, the term of this patent is extended or adjusted under 35 U.S.C. 154(b) by 0 days.

(21) Appl. No.: 10/860,796

(22) Filed: Jun. 3, 2004

(65) Prior Publication Data

US 2005/0012291 A1  Jan. 20, 2005

(30) Foreign Application Priority Data

Jun. 3, 2003  (IT)  ............................ MI2003A1108

(51) Int. Cl.
*B62K 5/08*  (2006.01)
(52) U.S. Cl. ...................................... 280/267; 180/210
(58) Field of Classification Search ........ 280/267–269, 280/279, 5.509, 124.103, 282, 62; 180/210
See application file for complete search history.

(56) References Cited

U.S. PATENT DOCUMENTS

| | | | | |
|---|---|---|---|---|
| 4,020,914 A | * | 5/1977 | Trautwein | ................... 180/210 |
| 4,072,325 A | * | 2/1978 | Bright et al. | ............ 280/5.521 |
| 4,351,410 A | * | 9/1982 | Townsend | ................... 180/210 |
| 6,367,824 B1 | * | 4/2002 | Hayashi | ....................... 280/62 |
| 6,817,617 B1 | * | 11/2004 | Hayashi | ................... 280/5.509 |

FOREIGN PATENT DOCUMENTS

DE            4139725            *  6/1993

\* cited by examiner

*Primary Examiner*—Anne Marie Boehler
(74) *Attorney, Agent, or Firm*—James V. Costigan; Hedman & Costigan, P.C.

(57) ABSTRACT

A three-wheel rolling vehicle with front two-wheel steering comprising a frame (13), a handlebar (16), a rear wheel (12) rotating with respect to the frame (13) and a steering group which operates two front wheels (14, 15), in which two horizontal crossbars (21, 22) are foreseen, connected through hinges (40–43) of the side tubes (36, 37) and through additional hinges (23, 24) to the frame (13), the tubes (36, 37) rotatably supporting steering tubes (31, 32).

5 Claims, 5 Drawing Sheets

THREE-WHEEL ROLLING VEHICLE WITH FRONT TWO-WHEEL STEERING

The present invention refers to a three-wheel rolling vehicle with front two-wheel steering.

In the field of vehicles, in particular in those with three wheels, an important embodiment diversification has been increasingly proposed over time.

In particular, three-wheel vehicles have been proposed with both one-wheel steering and with front two-wheel steering of varied construction, which however do not permit the production of a compact vehicle, safe to drive, easy to manoeuvre even if lacking foot support. Indeed, the general problems related to three-wheel vehicles as cited above may be identified in the lack of automobile stability, even if having the manageability of a motorcycle. In brief, the goal is to achieve a three-wheel vehicle which may be driven like a two-wheel vehicle (with driver tilt) while maintaining the better part of the stability generally possessed by a four-wheel vehicle.

Furthermore, a three-wheel vehicle of the specified type is required to allow a maximum ease of driving and comfort in city traffic. This in general arises from a limited width, though such to permit the driver from not necessarily placing his feet on the ground when stopped.

A vehicle such as that sought must absolutely allow good safety and protection in the presence of weather events. For example, a vehicle covering should be provided by way of a body, even if limited in size and overall dimension.

Principal purpose of the present invention is therefore that of resolving the problems and drawbacks mentioned above in a three-wheel vehicle equipped with front two-wheel steering.

Another purpose is to make a three-wheel vehicle which allows the greatest possible adhesion to the ground, even in the presence of a roll which favours driving as if it were a motorcycle.

Yet another purpose is to make a three-wheel vehicle which may receive a covering.

Not the last purpose is to make an economical three-wheel vehicle, with space for a passenger and luggage, safe and furnished with a certain comfort.

Yet another purpose is to make a three-wheel vehicle which has the smallest possible dimensions, with possible space available for additional and optional elements.

These purposes according to the present invention are achieved by making a three-wheel rolling vehicle with front two-wheel steering as described in claim 1.

Further characteristics and advantages of the present invention emerge from the subsequent dependent claims.

Figure 1:
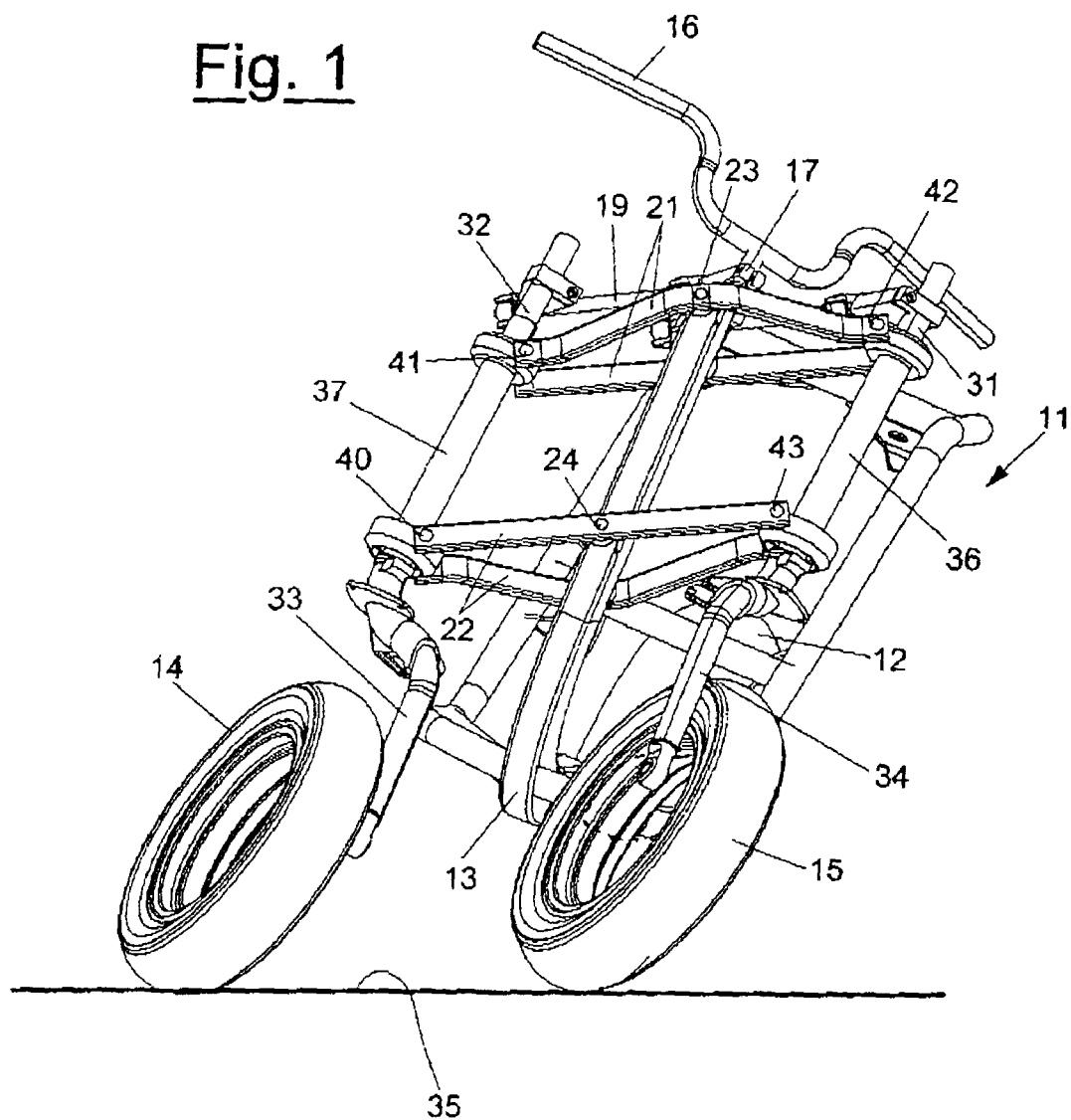
Figure 2:
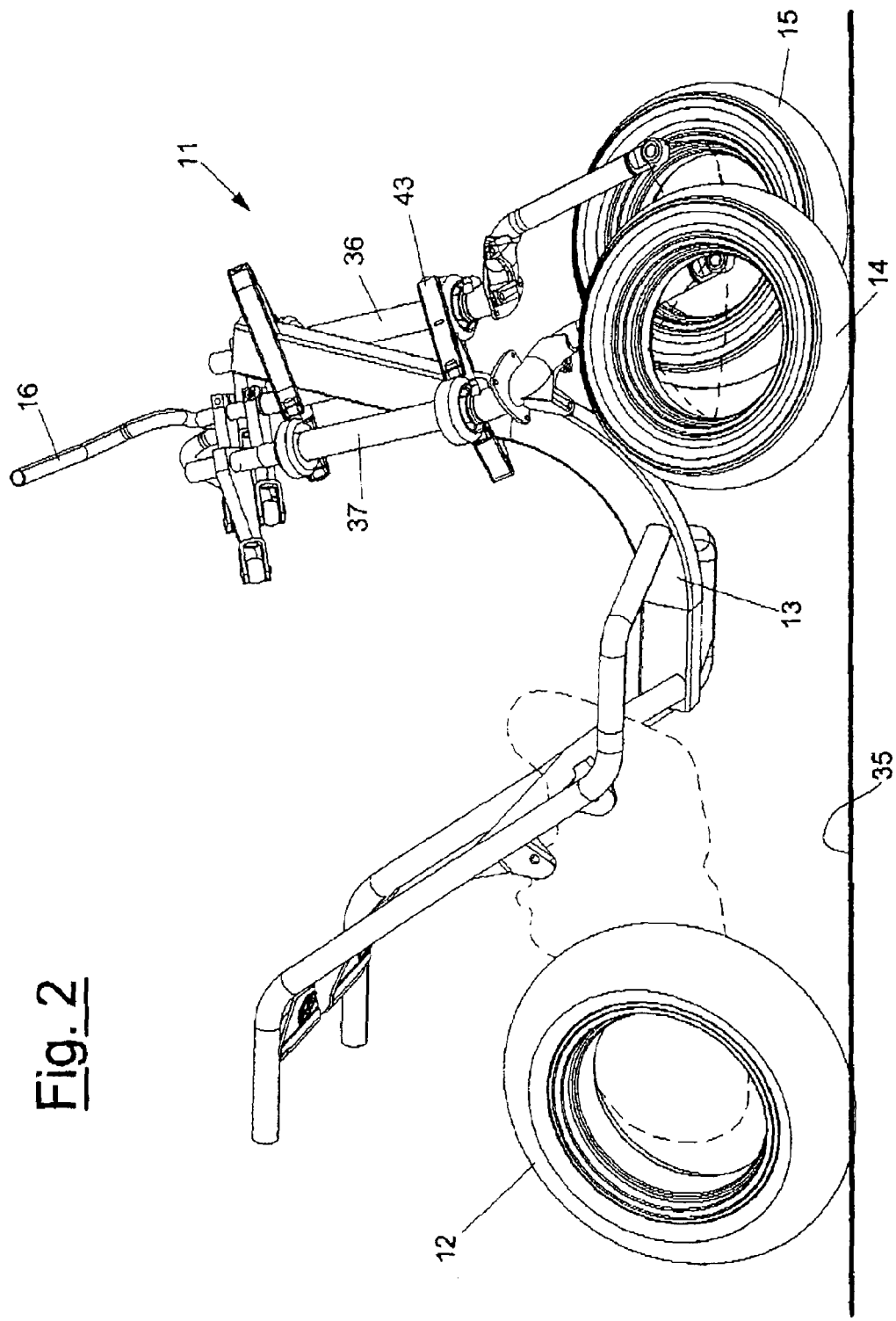
Figure 3:
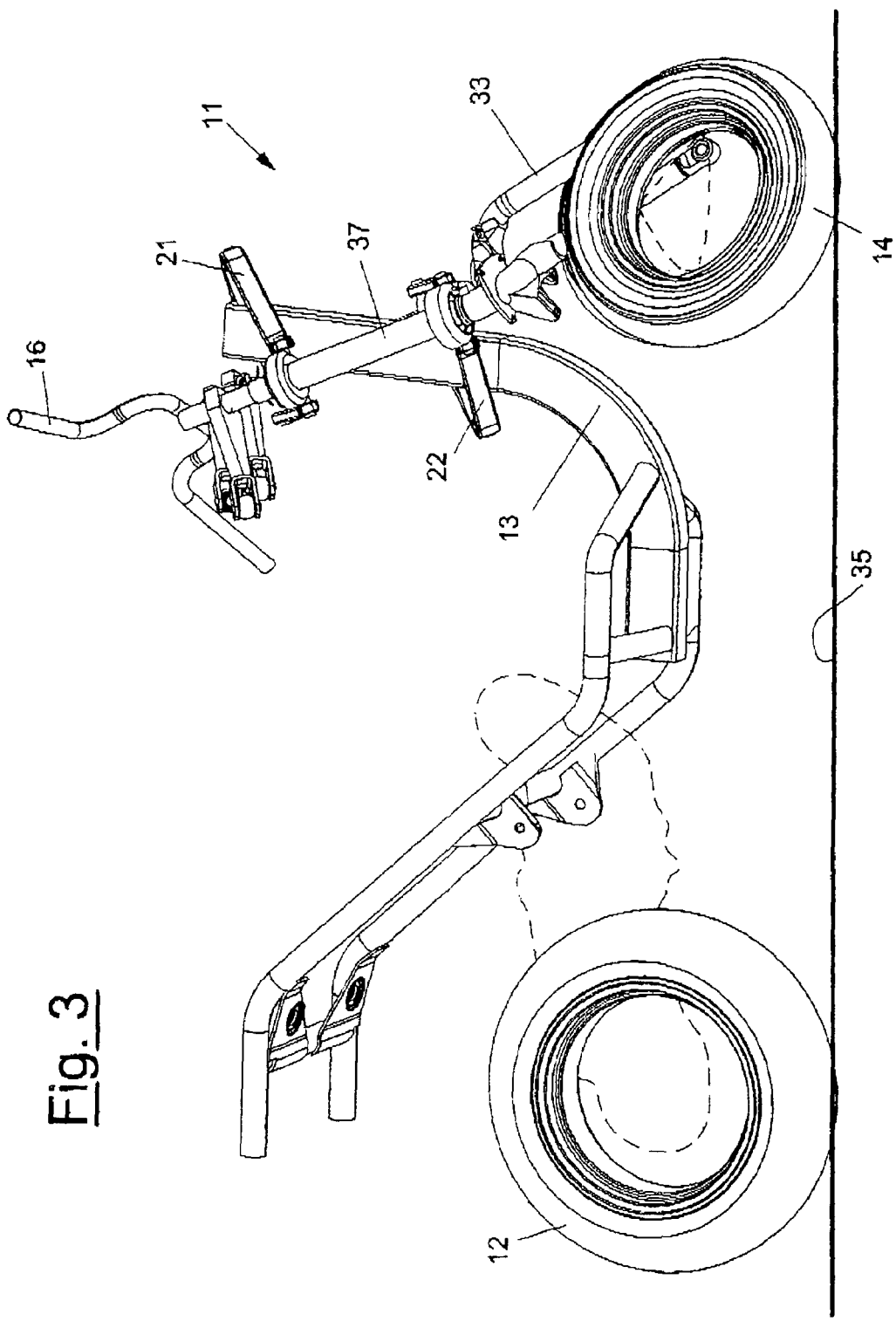
Figure 4:
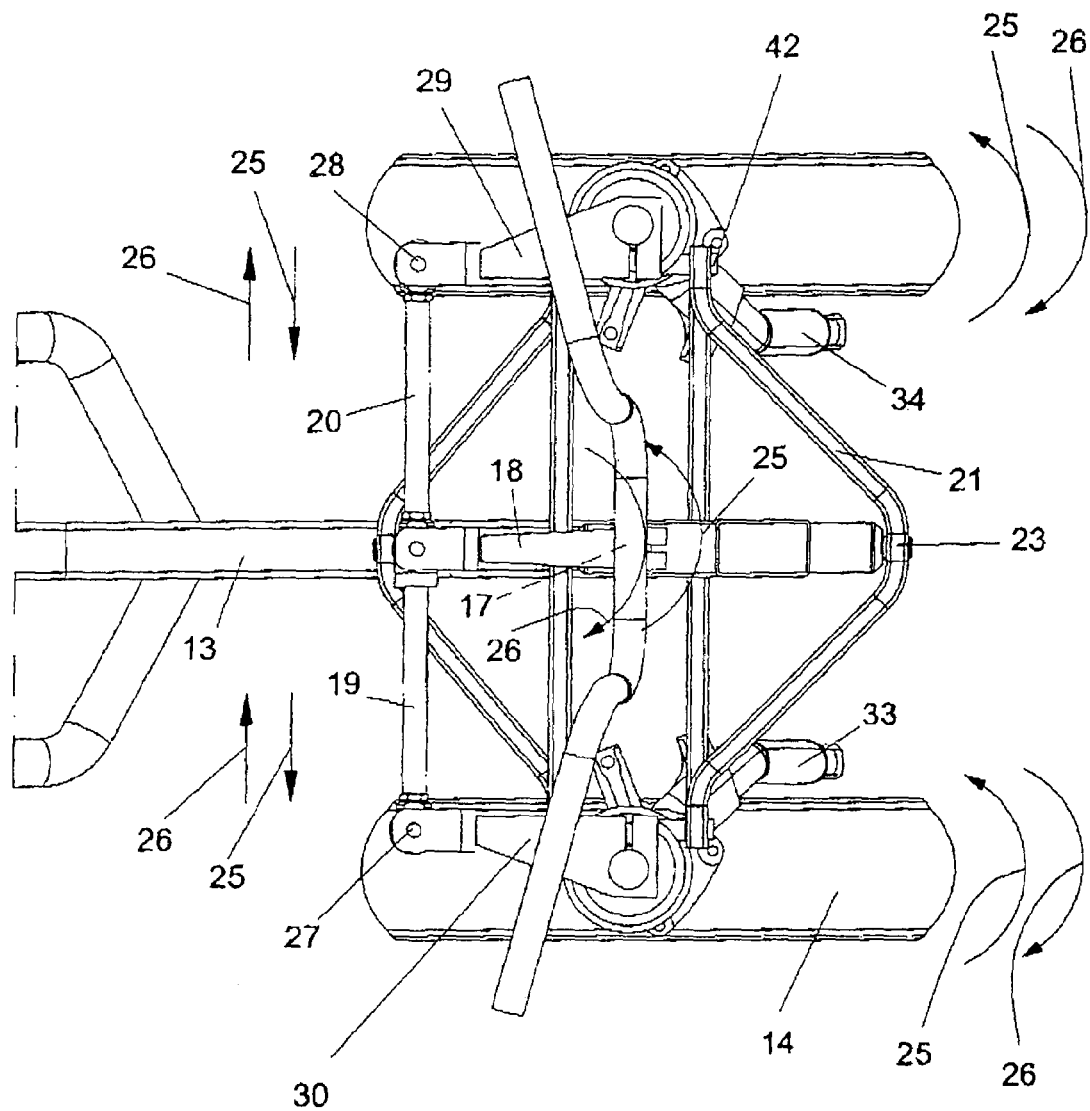

The characteristics and advantages of a three-wheel rolling vehicle with front two-wheel steering according to the present invention shall become clearer from the following exemplifying and non-limiting description, referring to the attached schematic drawings, in which:

FIG. 1 is a front perspective view of a three-wheel rolling vehicle with front two-wheel steering according to the present invention, where the connection to the front wheels is only partially shown, FIG. 2 is a side perspective view of the vehicle of FIG. 1, FIG. 3 is a different side perspective view of the vehicle of FIG. 1, without a front wheel, FIG. 4 is a partially enlarged plan view from above of the vehicle of FIG. 1.

Figure 5:
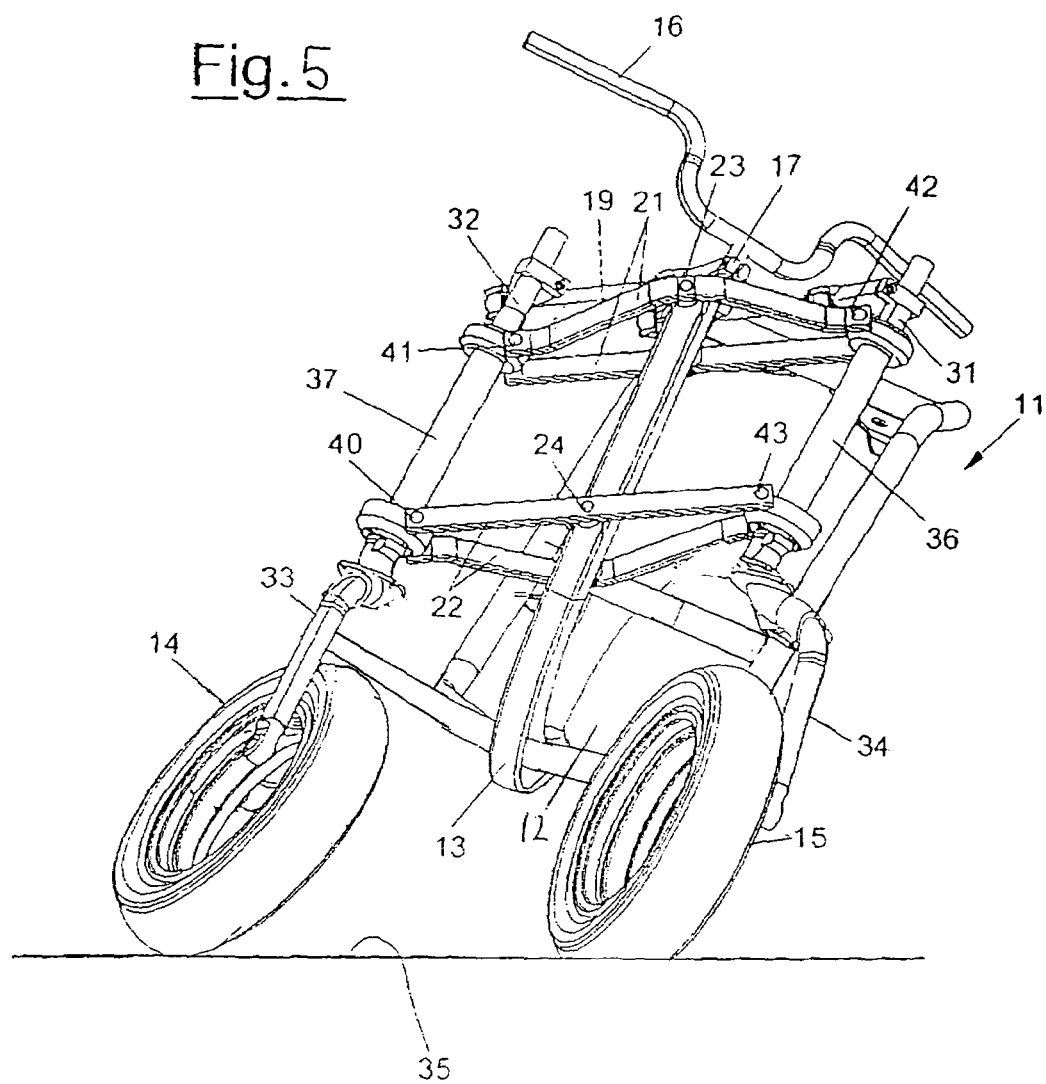

FIG. 5 is a side perspective view of the three wheel rolling vehicle of the invention which shows the suspensions in an external position relative to the wheels.

With reference to the figures, a three-wheel rolling vehicle with front two-wheel steering according to the present invention is shown, indicated in its entirety by 11.

The vehicle 11 essentially comprises a fixed-axis back wheel 12, a frame 13 and a couple of steering front wheels 14, 15. Furthermore, in general a handlebar 16 is provided through which it is possible to operate the steering front wheels 14, 15. From this first general arrangement, it is evident that the motor propulsion group and the rear suspension may be derived from any series vehicle, as with the front suspension, described here below in detail; complete equipment groups derived from the series may be used, from the wheel to the steering tube, even in the new and original placement in the invention.

The handlebar 16 is shown connected to the frame 13 by way of a cylindrical hinge 17, which corresponds to the steering axis. A lever 18 is integral with the handlebar and extends from it toward the interior of the vehicle 11; the lever 18 is in turn pivoted at one of its free ends to respective ends of a couple of rigid rods 19 and 20, which may move transversely with respect to the vehicle, due to oscillation from the lever 18.

Furthermore, the opposite free ends of these rods 19 and 20 are connected by ball joints 27 and 28 to additional levers 29 and 30, which transmit the steering movement to two steering tubes 31 and 32, which constitute the front, generating a steering movement on the two wheels 14 and 15, equipped with independent suspensions 33 and 34, one for each of the front wheels 14 and 15, equipped with shock absorbers, these too independent (not shown).

The lever 18, which as said is integral with the handlebar 16, operates therefore on the rods 19 and 20 such that during left steering movements, arrows 25, the two rods 19 and 20 act respectively as strut and tie rod; in the case of right steering movements, according to the arrows 26, the rod 19 acts as a tie rod and the rod 20 as a strut.

A kinematic steering mechanism is therefore made, to which a kinematic roll group is joined which, when the frame leans or tilts, allows both wheels 14, 15 to maintain contact with the road surface, indicated by 35.

It is noted that the kinematic roll group comprises two horizontal rigid crossbars 21 and 22, connected to the frame 13 by way of cylindrical pivots 23 and 24 fastened to the centre of the crossbars 21 and 22.

This kinematic roll group, which foresees overall an articulated quadrilateral, is constituted by two side tubes 36 and 37 and by two "double" horizontal crossbars, an upper crossbar 21 and a lower crossbar 22. The two crossbars 21 and 22 are hinged, at their ends, to the side tubes themselves 36 and 37 through cylindrical hinges 40–43, while at their centre point they are pivoted to the frame 13 by way of the cylindrical hinges 23 and 24.

The rear wheel 12, and its connection to the frame/rear axle (shock absorbers, etc.), as well as the wheel hub/shock absorber for the front wheels 14, 15, were not described in detail since they may be identical to any known solution for two-wheel vehicles.

Furthermore, it should be noted how the "double" horizontal crossbars 21 and 22 are fastened, at their centre point, to the frame without any normally-provided central tube. Each element of the "double" horizontal crossbars 21 and 22 is made of a single component (for example, as is visible in the figures, the two elements which constitute the crossbar 21, as those of the crossbar 22, are both made from a single rod).

In particular, the upper horizontal crossbar 21 is made such that its single component or two components rotate around the cylindrical hinge 23, by which they are connected to the frame 13. The lower horizontal crossbar 22 is made such that its single component or two components rotate around the cylindrical hinge 24, by which they are connected to the frame 13.

The two independent suspensions 33, 34 may be connected to the hubs of the wheels 14, 15 both in internal position and external position with respect to the two wheels.

The operation of this vehicle will immediately become clearer from the description and from the figures which outline and illustrate it in various positions, also with the absence of particular vehicle details in order to facilitate comprehension.

The vehicle with front two-wheel steering according to the invention permits combining the stability of an automobile with the manoeuvrability of a motorcycle. Indeed, generally, the front part of the vehicle (connected to the rear part with shock absorbing systems) is capable of having a rolling motion with/with respect to the rear part, such that the vehicle may be driven exactly like a two-wheel vehicle (driver tilt), while maintaining the better part of the inherent stability of a four-wheel vehicle.

Such a vehicle permits driving with maximum ease and comfort through city traffic, due to its limited width, and permits the driver to avoid placing his feet on the ground when stopped. In this feature, also improved safety and a certain prevention of possible problems tied to weather events have been proven, thanks to an improved stability.

A structure such as that described above also allows a possible, easier covering of the vehicle such to transform it into a car with body.

Moreover, several drawbacks of vehicles with single front-wheel steering may be eliminated, such as those which may be summarised in an imprecise driveability and trajectory setting due to the presence of single-wheel steering, with consequent skidding, etc., the need for a differential and little room for passenger and/or luggage.

On the base of that which has been described up until now, the advantages and new solutions foreseen by the vehicle of the present invention may thus be summarised.

The vehicle of the invention is defined as being halfway between a scooter and an automobile and has reaped advantages from both forms, due to its basic characteristics here summarised:

compact three-wheel vehicle for urban and extra-urban use;
driving position like that of a scooter, higher therefore with respect to that of an automobile, to guarantee good visibility;
good comfort both for the driver and passenger;
greater feeling of safety when driving;
manoeuvrability similar to that of a two-wheel scooter;
ease of manoeuvring when stopped;
elimination of the kick stand, in case of insertion of a rolling block;
elimination of the differential;
maximum acceleration and velocity similar to those of a scooter.

Overall a vehicle has been made capable of satisfying the needs of urban mobility and ease of parking almost like a two-wheel vehicle, without adversely affecting the level of comfort and safety with respect to a small car.

It has been noted that, advantageously for the front group, which has double steering and rolling function, a solution was developed which completely allows the two degrees of freedom, in order to avoid that steering is caused by the vehicle roll. The connection between the two wheels is also made in such a manner as to guarantee a kinematically-correct steering. Thus a three-wheel vehicle equipped with two parallel, front leading wheels, steering and tiltable, and a central rear wheel integral with the frame, such that the vehicle may be driven like a motorcycle (front part able tiltable—rolling motion—together with the rear).

The front steering group (articulated quadrilateral) may roll with respect to the rear part, the front wheels may in turn tilt like the rear wheel, always remaining however in contact with the ground and guaranteeing therefore a greater adherence to the street surface.

Thus it has been seen that a three-wheel rolling vehicle with front two-wheel steering according to the present invention achieves the previously-specified purposes.

The rolling, three-wheel vehicle with front two-steering as conceived is susceptible to numerous modifications and variants, all coming under the same inventive concept.

Furthermore, in practice the materials used, including their dimensions and components, may be any according to technical needs.

What is claimed is:

1. Three-wheel rolling vehicle with front tow-wheel steering comprising a frame (13), a handlebar (16), a rear wheel (12) rotating with respect to the frame (13) and a steering group which operates on two front wheels (14, 15), wherein two horizontal crossbars (21, 22) are provided, each of said horizontal crossbars (21, 22) being made of a single component and being connected by hinges (40–43) to side tubes (36, 37) and through additional hinges (23, 24) to said frame (13), said tubes (36, 37) rotatably supporting steering tubes (31, 32) and wherein the lower ends of said steering tubes (31, 32) bear independent suspensions (33, 34) connected to hubs of said front wheels (14, 15), said independent suspensions (33, 34) each being equipped with shock absorbers and being located in an external position with respect to said two front wheels.

2. Three-wheel rolling vehicle according to claim 1, wherein each of said horizontal crossbars (21, 22) is made of two elements connected to the frame (13).

3. Three-wheel rolling vehicle according to claim 1, wherein said handlebar (16) is rotatably connected to said frame (13).

4. Three-wheel rolling vehicle according to claim 1 or 3, wherein from said handlebar (16), which is rotatably connected to said frame (13), a lever (18), integral to said handlebar (16), extends toward the interior of the vehicle (11) and is mounted to the rear of said handlebar (16), said lever (18) being in turn pivoted at one of its free ends to respective ends of a couple of rigid rods (19, 20), the opposite free ends of which are connected by ball joints (27, 28) to additional levers (29, 30), which transmit the steering movement to two steering tubes (31, 32).

5. Three-wheel rolling vehicle with front tow-wheel steering comprising a frame (13), a handlebar (16), a rear wheel (12) rotating with respect to the frame (13) and a steering group which operates on two front wheels (14, 15), wherein two horizontal crossbars (21, 22) are provided, each of said horizontal crossbars (21, 22) being made of a single component and being connected by hinges (40–43) to side tubes (36, 37) and through additional hinges (23, 24) to said frame (13), said tubes (36, 37) rotatably supporting steering tubes (31, 32) and wherein the lower ends of said steering tubes (31, 32) bear independent suspensions (33, 34) connected to hubs of said front wheels (14, 15), said independent suspensions (33, 34) each being equipped with shock absorbers and each being located in an internal position with respect to said two front wheels.

* * * * *